(12) United States Patent
Teruel

(10) Patent No.: US 11,179,921 B1
(45) Date of Patent: Nov. 23, 2021

(54) BIODEGRADABLE REINFORCED PAPER PACKAGING MATER

(71) Applicant: Nelson Luis Teruel, Jaguariúna (BR)

(72) Inventor: Nelson Luis Teruel, Jaguariúna (BR)

( * ) Notice: Subject to any disclaimer, the term of this patent is extended or adjusted under 35 U.S.C. 154(b) by 168 days.

(21) Appl. No.: 16/395,540

(22) Filed: Apr. 26, 2019

Related U.S. Application Data

(63) Continuation-in-part of application No. 15/350,734, filed on Nov. 14, 2016, now abandoned.

(51) Int. Cl.
| | | |
|---|---|---|
| *B32B 27/10* | (2006.01) | |
| *B65D 65/40* | (2006.01) | |
| *B65D 65/46* | (2006.01) | |
| *B32B 27/32* | (2006.01) | |
| *D21H 19/82* | (2006.01) | |
| *D21H 19/12* | (2006.01) | |
| *D21H 27/10* | (2006.01) | |
| *D21H 21/36* | (2006.01) | |
| *B65D 65/42* | (2006.01) | |

(52) U.S. Cl.
CPC .............. *B32B 27/10* (2013.01); *B32B 27/32* (2013.01); *B65D 65/40* (2013.01); *B65D 65/42* (2013.01); *B65D 65/466* (2013.01); *D21H 19/12* (2013.01); *D21H 19/82* (2013.01); *D21H 21/36* (2013.01); *D21H 27/10* (2013.01); *B32B 2255/10* (2013.01); *B32B 2255/12* (2013.01); *B32B 2255/24* (2013.01); *B32B 2255/26* (2013.01); *B32B 2307/7163* (2013.01); *B32B 2439/00* (2013.01)

(58) Field of Classification Search
None
See application file for complete search history.

(56) References Cited

U.S. PATENT DOCUMENTS

| | | | |
|---|---|---|---|
| 8,551,614 B2* | 10/2013 | Zein | B65D 65/40 428/337 |
| 2014/0212591 A1* | 7/2014 | Swei | C09D 175/04 427/385.5 |

OTHER PUBLICATIONS

ESA Operating instructions from https://www.eltex.de/en/products/systems/esa-en/gnh61/.*

* cited by examiner

*Primary Examiner* — Laura C Powers
(74) *Attorney, Agent, or Firm* — Sanchelima & Associates, P.A.; Christian Sanchelima; Jesus Sanchelima

(57) ABSTRACT

A paper packaging material having a paper layer with a polyethylene coating on one surface, a biodegradable resin grid on the opposite surface to enhance its strength while maintaining reduced weight and a thermo-sealing resin, which eliminates the use of glues in the packaging process. The vegetal resin is made out of vegetable wax, acrylic styrene copolymer, demineralized water, water based silicone and natural fungicide.

3 Claims, 5 Drawing Sheets

BIODEGRADABLE REINFORCED PAPER PACKAGING MATER

OTHER RELATED APPLICATIONS

The present application is a continuation-in-part of pending U.S. patent application Ser. No. 15/350,734, filed on Nov. 14, 2016, which is hereby incorporated by reference.

BACKGROUND OF THE INVENTION

Field of the Invention

The present invention relates to an innovative biodegradable reinforced paper packaging material.

Description of the Related Art

Several approaches to provide closed packages or wrappers from paper coated with extruded polyethylene have been designed in the past. One of these closed packages is used for packaging reams R of paper or to wrap food products. In order to increase the mechanical strength of the packaging material, thicker films of paper coated on one surface with polyethylene have been traditionally used. This approach, however, does not prevent the mechanical strength infirmity encountered when the package is exposed to a high humidity steam environment. The heavier paper makes the final package much more expensive also.

Usually to seal packages (such as those used to package reams of paper) the state of the art uses liquid, pasty or hot melt adhesives applied during the packaging operation. Controlling and registering these adhesives in the packaging operation is difficult. It is necessary to adjust the speed, of the machinery handling the paper, as well as the temperature and viscosity of the glue. The equipment has to operate at reduced speed losing production hours for cleaning and maintenance. Additionally, there are costs associated with using adhesives during the packaging operation.

The present invention provides paper packaging material with reduced thickness while increasing its mechanical strength and also eliminates the need to use glue. Also, a barrier against moisture is provided allowing a clean and full speed operation. The package closing is achieved with controlled thermo-sealing techniques without using external adhesives on the packaging.

These novel features, while desired for a long time, have not been provided by the paper packaging materials currently existing in the state of the art.

The need for using ecologically compatible materials for wrappers and flexible materials for packaging in general is well documented. See WO2011075830 corresponding to a patent publication for a flexible cellulosic fiber-based honeycomb material dated Dec. 22, 2009. While the approach discussed in this publication utilizes recyclable and biodegradable materials in creating a honeycomb, the space taken by the hexagonal open-ended core cells does not make the resulting material suitable for wrapping. In the present invention the grids formed with vegetal biodegradable resin are intertwined with the cellulose fibers in the paper layer with the attendant reinforcement keeping the paper layer to a minimum thickness. Additionally, the vegetal resin used in the present invention provides impermeability as well as strength with less amount of material.

The paper wrapping industry faces the problem of optimizing the structural integrity of the packaging materials while maintaining a minimum weight and helping its impermeability characteristics with the use of plastic materials. The present invention solves the problem providing a remarkable leap in the optimization of the film's desired characteristics while reducing its weight.

Paper packaging material in the present invention is reinforced paper layer with a biodegradable low-density polyethylene layer in the surface and having a biodegradable resin that provides sufficient impermeable characteristics to protect the wrapped contents against humidity damage.

Applicant believes that another related reference corresponds to U.S. Pat. No. 8,551,614 for a three-layer wrapping and its manufacturing process. However, it differs from the present invention because it utilizes three layers (two of polymeric material and one natural material) of material with the consequent increase in weight and cost. This is characteristic of the state of the art in this field and it is this problem that this invention solves.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a biodegradable paper packaging material or wrapper with increased mechanical strength allowing the use of reduced basis weight papers (less thickness) while at the same time generating a lighter, more resistant and economical packing material.

It is another object of the present invention to provide such a packaging material with increased efficacy against moisture and steam of polyethylene-coated papers, offering more impermeability with supplementary strength, protecting the product inside the package from excess of moisture.

It is still another object of the present invention to provide such a paper packing resulting in a clean package closing by thermo-sealing operation without using adhesives or glues in the process.

It is a further object of this invention to provide such an article of manufacture that is inexpensive with low cost packaging maintenance, while exploring maximum machine speed with guaranteed effectiveness.

Further objects of the invention will be brought out in the following part of the specification, wherein detailed description is for the purpose of fully disclosing the invention without placing limitations thereon.

DETAILED DESCRIPTION OF THE EMBODIMENTS OF THE INVENTION

Figure 1:
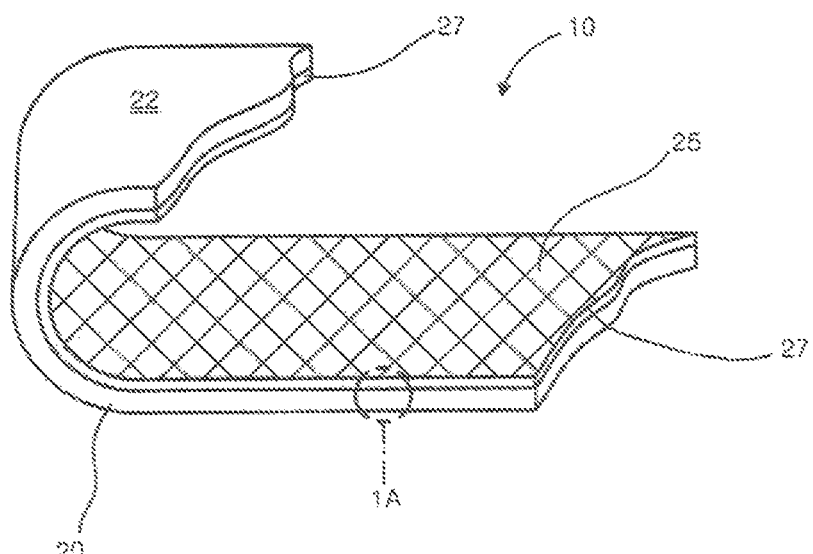
FIG. 1 is an isometric representation of a portion of the dried paper web with graphics printed on one face and the vegetal resin applied on the other face. The vegetal resin is shown to penetrate inside the paper layer in the areas of the applied reinforcing alveolar designs.

The present invention relates to a paper packaging material 10 using a biodegradable vegetal based resin 30 to create a strong chemical pulp fiber bonding that penetrates inside the layer of a paper web or core layer 20, vegetal based resin 30 creates a better barrier against moisture (only applied on the selected areas to ensure closure function). The packaging material 10 includes a controlled thermo-sealing area on the side 22 of the paper web 20 where it has been previously covered with a layer of polyethylene. The resulting packaging material 10 is biodegradable and a compostable additive is added to turn it sustainable.

The first step of the method for manufacturing package material 10 is printing the graphics for publicity and/or the advertising. These can be applied preferably by flexographic, rotogravure, offset and/or digital printing technologies on surface or face 22.

The second step of the method is drying paper web 20 that will be used by unwinding it in a proper machine suitable for this purpose and known in the paper industry. The drying process should remove between 30% and 60% of thin paper original moisture by either using heated calendars or blown hot air with temperatures in the range between 60° C. and 120° C. during enough time and speed to achieve the mentioned parameters.

The third step is the application of a waterproof liquid vegetal resin composition to the paper. The printing or application of vegetal resin 30 is performed using, in one of the preferred embodiments, namely, rotogravure techniques. Rotogravures techniques include the use of an electrostatic field to achieve resin penetration inside paper web 20. The electrostatic process is referred to as ESA. See eltex.com.

Figure 1A:
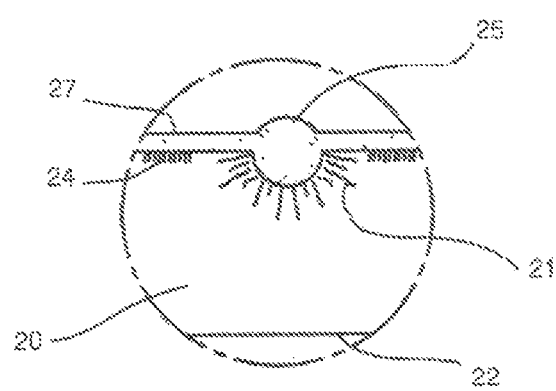
FIG. 1A is cross-section representation of a portion of the dried paper web showing the alveolar design 25 applied thereon illustrating its penetration.
Figure 1B:
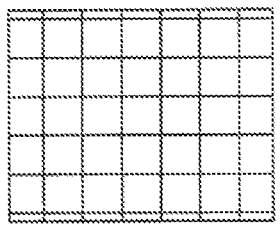
FIG. 1B through 1E represent different possible shapes for the alveolar designs 25.
Figure 1C:
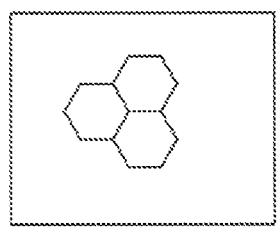
Figure 1D:
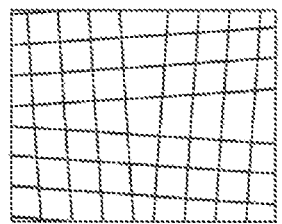
Figure 1E:
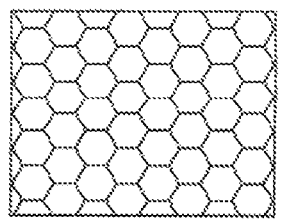
Figure 2:
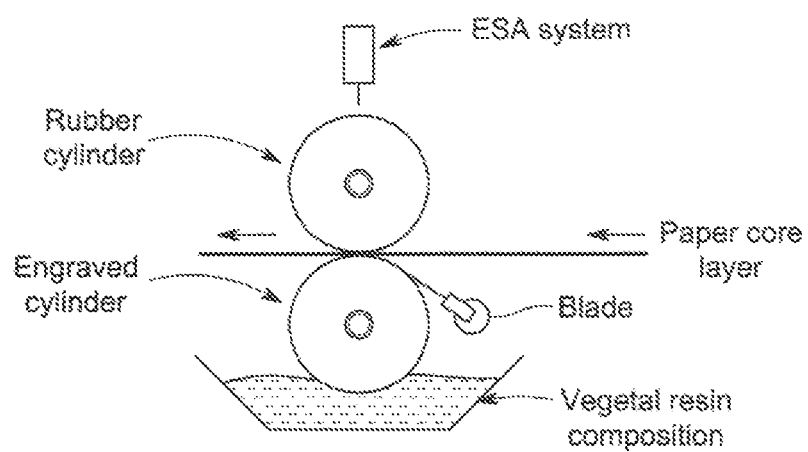
FIG. 2 is a representation of the paper core layer passing through an engraving cylinder and a rubber cylinder used to apply the vegetal resin.
Figure 3:
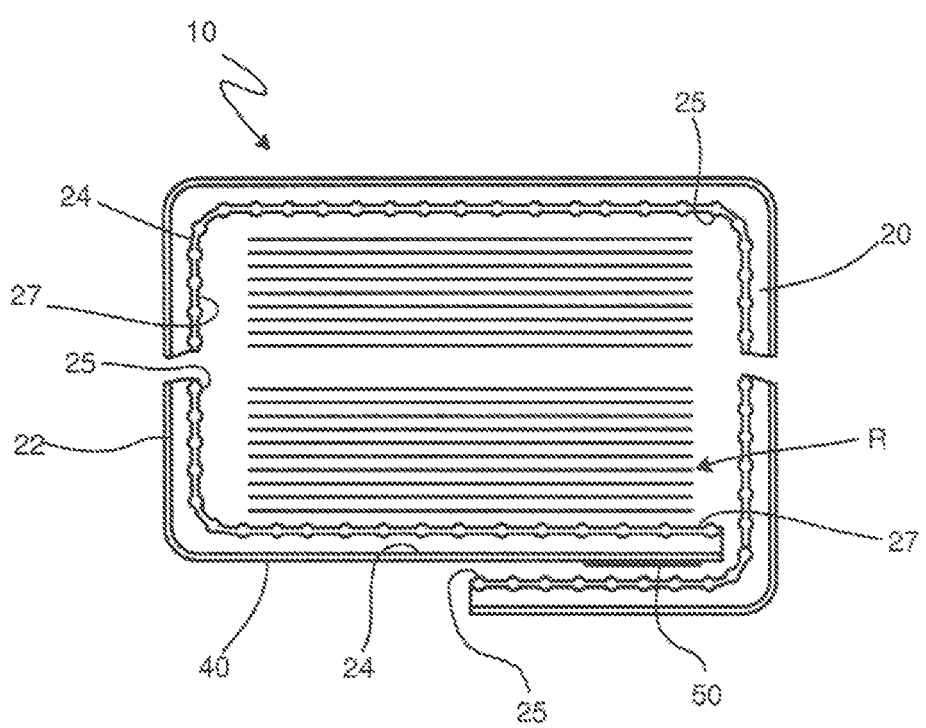
FIG. 3 is a representation of an application for the packaging material to protect reams of paper.
Figure 4:
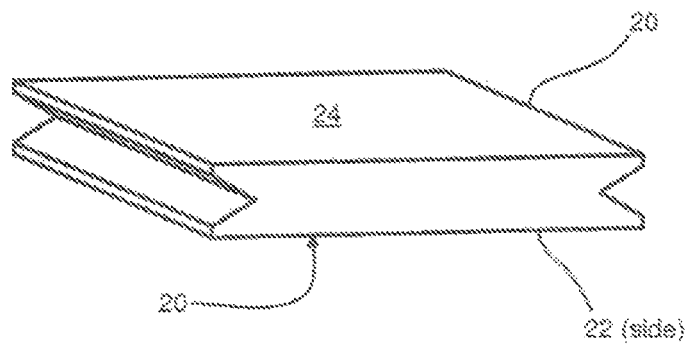
FIG. 4 is a detail enlarged isometric representation of a portion of the paper web.
Figure 5:
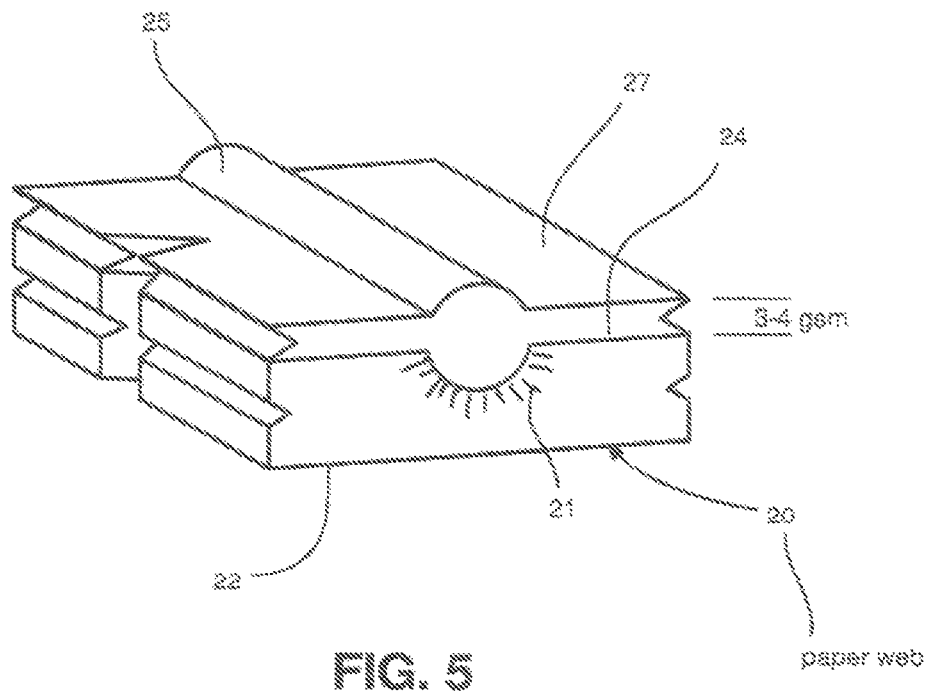
FIG. 5 is a detail enlarged isometric representation of the paper web 20 shown in the previous figure after the rotogravure operation has applied the vegetable resin and the alveolar design 25 was applied.

Vegetal resin is applied on the other surface 24 of paper web 20 either by rotogravure or indirect flexography technologies, utilizing engraved cylinders with alveolar shaped designs. By alveolar shaped designs it is to be understood any patterns or designs 25 that are closed such as squares, diamonds, rhomboids, honeycomb like, etc. These designs are similar to those used in construction for reinforcement grids inserted in concrete slabs. This third step has the following characteristics:
a) The vegetal liquid resins 30 used have a viscosity between 17 seconds and 55 seconds under Zahn 2 method. See es-france.com.
b) The cylinder for the vegetal resin 30 application applies the latter with two or more transfer depths in the alveolar shaped designs. In addition, surface 24 of the paper (opposite to where the advertising is printed) will be covered 100% by vegetal resin 30 with at least 3 grains per square meter. This application of the vegetal resin 30 covers 100% of surface 24 and increases paper impermeability. The application with the vegetal resin 30, will reach deep 21 in paper web 20, as shown in FIGS. 1A and 5. The application of resin 30 will occur in selected areas that can be done by repeating closed patterns 25 (alveolar designs) which, in combination, define the reinforcement areas.
c) The vegetal resin 30 application using rotogravure technology is more efficient using ESA (electrostatic assist) liquid transfer technology optimized by electrostatic charges that improve resin penetration in paper fissures and micro cavities, as illustrated in FIG. 1A.
d) Vegetal resin 30 has biodegradable and compostable characteristics, offering a sustainable condition to paper as for well as the resulting package that can be re-pulpable.

The fourth step is the application of polyethylene 40 by extrusion coating on the same surface 22 of the paper where publicity or advertising printing is applied as follows:
a) The polyethylene 40 application is done with flat die, where the liquid polyethylene film is deposited on the paper forming a uniform polyethylene film with controlled thickness. This step is known in the industry.
b) The application of a predetermined amount of polyethylene 40 can vary between 6 and 20 grains per square meter of film of paper. Better impermeability is achieved with a thicker polyethylene film.
c) The polyethylene extrusion coating must receive corona treatment to allow graphic printing by using thermo-sealing varnish, which defines the areas for sealing the package. See vetaphone.com.
d) The polyethylene has biodegradable and compostable characteristics, offering a sustainable condition to paper as well as the resulting package that can be re-pulpable.

The fifth step is the application of a thermo-sealing varnish 50 by using the rotogravure process on pre-defined areas that will be set for closing the package with the following characteristics:
a) The thermo-sealing resin or varnish 50 will be applied with a volume equal or greater than 3 grains per square meter on preselected areas. These areas are selected to ensure the closure function for the package.
b) The thermo-sealing resin has a fusion temperature equal or greater than 70° C. and its fusion is compatible with the polyethylene 40 layer coating fusion combining both sealing strengths.
c) The application of such thermo-sealing resin 50 replaces and eliminates the use of liquid or viscous glues.

The above five described steps complete the production of the film of paper with alveolar shape design 25 providing reinforcement and thermo-sealing features. The film of paper in rolls (that can be cut in sheets) is now ready to be used in the packaging process generating savings by reducing the packaging material weight in addition to eliminating of glue cost.

This new chemical strengthening technique and thermo-sealing control affinity can be used with monolayer papers or laminated papers with other substrates such as polypropylene with one or more layers and can also be used with bi-axially oriented polypropylene (BOPP) with one or more layers. The thickness for above-mentioned films may vary from 10 microns (0.4 mil) to 300 microns (12 mil).

The biodegradable and compostable resin chemical formula is disclosed below.

| PRODUCT | OPTIMAL | MINIMUM | MAXIMUM |
| --- | --- | --- | --- |
| Vegetal wax | 50% | 45% | 55% |
| Acrylic Styrene Copolymer | 30% | 23% | 33% |
| Demineralized water | 18% | 15% | 22% |
| Water based silicone | 1% | 0.8% | 1.2% |
| Biocidal/Natural Fungicide | 1% | 0.9% | 1.1% |

TECHNICAL SPECS

| PROPERTIES | MINIMUM | MAXIMUM |
|---|---|---|
| Solid content (%) | 30 | 35 |
| Viscosity Brookfield at 25° C. (cps) | 200 | 300 |
| pH at 25° C. | 7.5 | 8.5 |
| Stability | Separation Free | |
| Aspect | Milky White Liquid | |
| Diluent while still humid | Water | |

Comparative Resistance Tests

Hereafter a comparison between Product 1 (traditional package) and Product 2 (Invention's package):

| Product 1 | Product 2 |
|---|---|
| 81 gsm paper | 78 gsm paper |
| 11 gsm polyethylene resin | 10 gsm polyethylene resin |
| 1.5 gsm inks | 3.5 gsm vegetal resin |
| | 0.5 gsm thermo-sealing resin (overall) |
| | 1.5 gsm inks |
| 93.5 gsm total weight | 93.5 gsm total weight |

The total weight of the abovementioned products (Product 1 and Product 2) refers to their overall weight. The "gsm total weight" includes the weight of each application of the vegetal and thermo-sealing resin in the entire area of the package material. The vegetal resin is applied throughout the entire surface 24 and therefore its overall thickness (3-4 gsm) is maintained. The thermo-sealing resin also has a thickness or density of 3-4 gsm but it is only applied in preselected areas for closure purposes. When computing the total weight of the product, the contribution to the total weight of the package material by the thermo sealing resin drops to 0.5 gsm since there are areas that do not include the thermo-sealing resin. For example, if the total surface area where thermo-sealing resin 50 is going to be selectively covered has 1 square m. and thermo-sealing resin 50 with a density of 4 gsm is selectively applied in one eighth of the total area, then the overall amount of thermo resin 50 is:

1 sq m×⅛×4 g/sq m=0.5 g

Then, the overall weight contribution of the thermo-sealing resin having 4 gsm on surface 22 of 1 m is 0.5 gsm. The products comparison was held constant as to the total weight and the relative strength of the resulting package then compared. The unexpected increase in the strength of the material is extraordinary. Those skilled in the art are preoccupied with keeping the weight down of the packaging material while enhancing its strength.

| COMPARATIVE DATA | UNIT OF MEASURE | CONVENTIONAL PACKAGE | INVENTION'S PACKAGE | RESULT % |
|---|---|---|---|---|
| Basis weight | grams/m² | 92 | 92 | 0% |
| Thickness | Micron | 109 | 110 | +1% |
| COBB Test (humidity) | % | 53% | 30% | −15% |
| Burst | KPa | 288 | 313 | +8.68% |
| Longitudinal Tension | KN/m | 4.9 | 5.6 | +14.28% |
| Cross Tension | KNm | 3.0 | 3.4 | +13.33% |
| Longitudinal Tear | m/N | 630 | 708 | +12.38% |
| Cross Tear | m/N | 619 | 680 | +9.85% |
| Longitudinal Stiffness | Grain-force/cm | 1.5 | 2.3 | +53.33% |
| Cross Stiffness | Gram-force/cm | 0.9 | 1.1 | +22.22% |

By analyzing laboratory tests made on the new product in comparison to the conventional packing material, we can observe a mechanical resistance increase by 12.38%, plus a humidity resistance increase by 15% by reducing the water absorption by 15%. Both parameters lead to the conclusion that the present invention results in better product allowing the possibility to reduce the paper basis weight as well as the polyethylene resin volume application by approximately 12% while maintaining the same protection level. This results in substantial packaging cost savings. The greater tear resistance provides greater physical strength of the packaging and reducing moisture absorption, keeping these mechanical strength characteristics more stable and durable. For example, if the mechanical strength increases by 12% we can say that it is possible to reduce the thickness of the paper proportionally, thus reducing its cost per package and follow having an equal resistance of the package. If the moisture in the paper falls by 15%, will have greater strength of the paper in the package not break when exposed to moisture.

The foregoing description conveys the best understanding of the objectives and advantages of the present invention. It is to be understood that all matter disclosed herein is to be interpreted merely as illustrative, and not in a limiting sense.

What is claimed is:

1. A packaging material, comprising:
   A) a paper web having between 70 and 85 gsm having first and second surfaces;
   B) a layer of a biodegradable vegetal resin covering said first surface, said layer having a thickness between 3 and 4 gsm and further having at least one grid design applied on said layer first surface partially penetrating said paper web;
   C) a polyethylene film covering said second surface, said film having a density between 8 and 10 gsm; and
   D) an effective amount of a thermo-sealing varnish applied on selected areas over the polyethylene film, said effective amount being equal or greater than 3 grams per square meter.

2. The packaging material set forth in claim 1 wherein said biodegradable vegetal resin consists essentially of a vegetal wax, acrylic styrene copolymer, demineralized water, water based silicone and a natural fungicide.

3. The packaging material set forth in claim 1 wherein said biodegradable vegetal resin consists essentially of: acrylic styrene copolymer between 23% and 33% of the weight of said resin, vegetable wax between 45% and 55% of the weight of said resin, demineralized water between 15% and 22% of the weight of said resin, and water-based silicone between 0.8% and 1.2% of the weight of said biodegradable vegetal resin.

\* \* \* \* \*